July 5, 1932. F. B. STOVER 1,866,377
PRESSURE REGULATOR
Filed Jan. 22, 1931
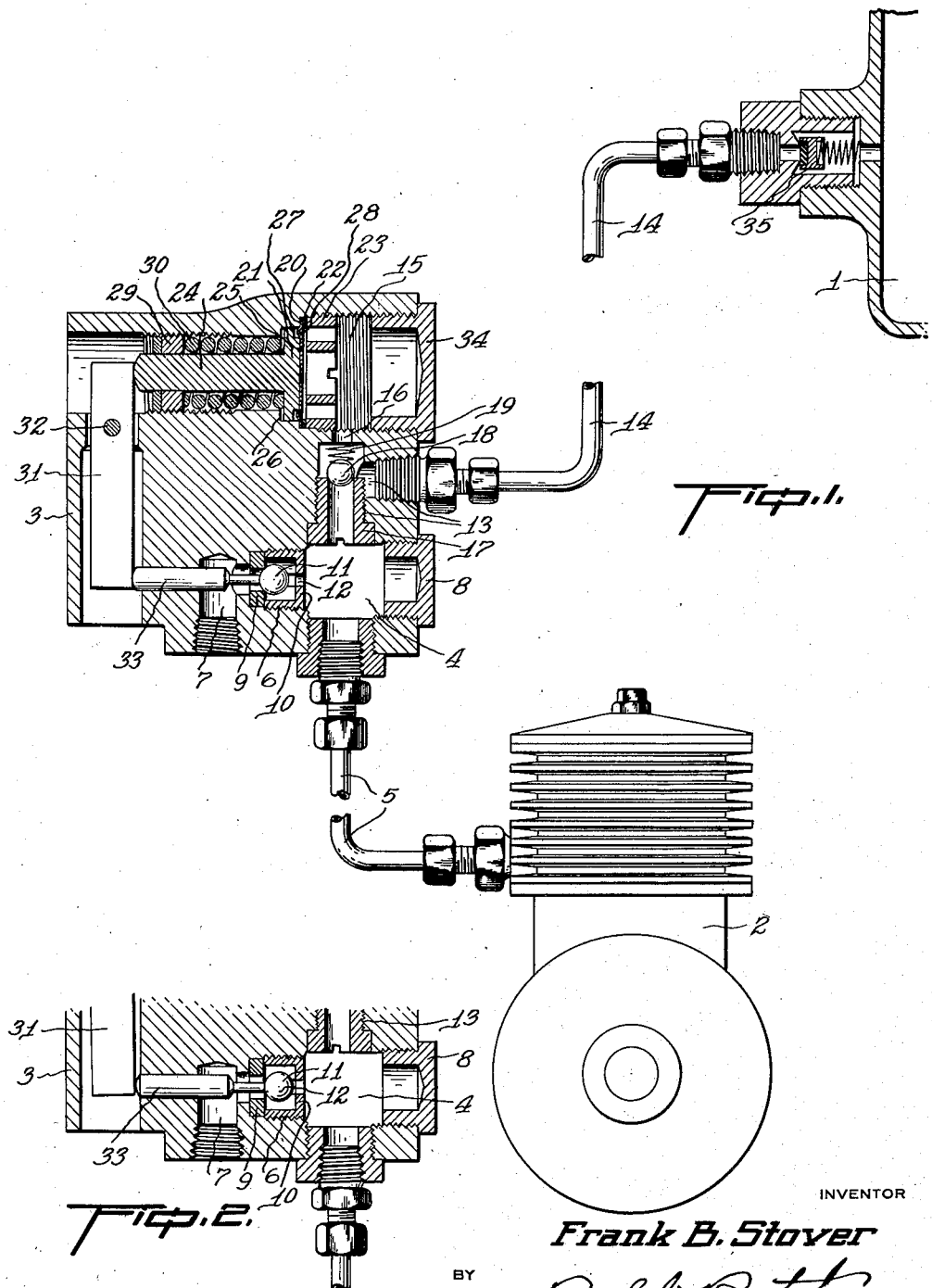
INVENTOR
Frank B. Stover
BY
ATTORNEYS Patented July 5, 1932

1,866,377

UNITED STATES PATENT OFFICE

FRANK B. STOVER, OF DETROIT, MICHIGAN, ASSIGNOR TO SKY SPECIALTIES CORPORATION, OF DETROIT, MICHIGAN, A CORPORATION OF MICHIGAN

PRESSURE REGULATOR

Application filed January 22, 1931. Serial No. 510,487.

The present invention pertains to a novel pressure regulator or safety valve for a tank containing fluid under pressure.

The principal object of the invention is to provide a novel device of this character which is more efficient and reliable than those now available, particularly in apparatus undergoing wide temperature changes and subjected to freezing temperatures, as in the case of the air pressure systems for starting aeroplanes.

One of the distinguishing characteristics of the present invention is that the relief valve is inserted in the sole fluid connection between the pump and the receiver and is normally open to the atmosphere, being closed to the atmosphere only by pressure in the intake. Thus, the receiver to be controlled receives no fluid except that which passes through the regulator, while any defect in the system, failing to close the relief to the atmosphere, prevents the receiver from being charged at all rather than allowing it to become overcharged. This arrangement is to be distinguished from existing systems wherein the atmosphere relief opens only on attainment of a given pressure, a serious defect of which is that the atmosphere relief may fail to open due to freezing or other defects in the system, thereby allowing the receiver to be overcharged. Another distinction in the operation of the present invention is that the regulator exercises control of the pressure in the receiver before the latter is charged rather than after charging as in the case where the safety valve is merely in the form of an independent connection to the receiver. In the latter type of installation, a defect in the safety valve may render the same inoperative while permitting the receiver to be overcharged.

In the air pressure systems carried by aeroplanes for starting purposes, defects in the pressure regulating system are more common than in other apparatus, particularly because of the freezing of some of the movable parts of the regulator or relief valve. It is desirable to place the regulator near the compressor or motor to prevent such freezing but this is not possible where the regulator is connected directly to the tank. By the present invention such positioning of the regulator is entirely feasible, although not strictly necessary, and does not require that the receiver be placed in the heated zone.

The invention is fully disclosed by way of example in the following description and in the accompanying drawing in which—

Figure 1 is a sectional view of the pressure regulator closed to the atmosphere and of the intake of the receiver, showing also the compressor or pump in elevation; and Fig. 2 is a fragmentary sectional view of the regulator open to the atmosphere.

Reference to these views will now be had by use of like characters which are employed to designate corresponding parts throughout.

Air under pressure is charged into a tank or receiver 1 by means of a compressor 2 connected in any desired manner to a motor, such as the motor of an aeroplane. Because of the piping system presently to be described, the receiver may be carried at the rear end of the plane.

The pressure regulator or safety valve of this invention is comprised in a body 3 connected directly in series with the pump and receiver as will presently appear. The regulator has an intake passage 4 connected to the outlet of the pump by means of suitable tubing 5. A passage 6 is drilled in the body 3 transversely of the intake 4 and terminates at one end in a relief opening 7 which is open to the atmosphere. The other end which is directly adjacent the intake 4 is closed by a plug 8. This is merely a detail of construction inasmuch as the passage 6 may conveniently be drilled from the side of the body 3 in which the plug 8 is screwed. In the passage 6 is inserted a ring 9 which functions as the seat of a valve controlling communication between the intake 4 and the atmosphere relief 7. A hollow nut or cage 10 is fitted in the passage 6 at that side of the seat 9 facing the intake 4. The nut or cage contains a floating valve 11 adapted to close the seat 9 under the conditions presently to be described, and the feed or intake end of the cage is formed with a comparatively small admission port 12 which at the same time prevents the valve 11 from rolling away from its seat. When a ball valve is used, the diameter is such that, when the ball rests in the bottom of the cage, its center is below the center of the valve seat 9, so that the valve must be raised against gravity in order to close on its seat.

An outlet 13 is extended from the intake 4 through a side of the body 3, whereby it may be connected to the receiver 1 as by tubing 14.

A chamber 15 is drilled through the body parallel to the passage 6, although not necessarily so, and one end thereof is brought into communication with the outlet 13 by means of a port 16. Beneath this port, a tubular valve seat thimble 17 is threaded into the outlet 13 and is adapted to be closed by a valve 18 resting thereon and backed by a light spring 19. This valve structure is adapted to close the chamber 15 to the intake 4 but not to the outlet tube 14. In other words, it is a check valve between the pump and receiver, opening only in the charging direction.

A shoulder 20 is formed in the wall of the chamber 15 and serves as a rest for a diaphragm 21 which may consist of a number of superimposed thin metal disks. A washer 22 engages the margin of the forward face of the diaphragm and is retained by a cored nut 23 threaded into the passage 15, whereby the diaphragm is clamped against the shoulder 20. Behind the diaphragm is mounted a rod 24 formed at one end with a head 25 having a slight sliding movement in a recess 26 formed in the wall of the passage 15. The forward face of the head is relieved at 27 to receive an annular rib 28 formed in the diaphragm. The unrelieved part of the face engages the back of the diaphragm. A guide ring 29 is secured in the passage to serve as a support for the rear end of the rod 24. Between this guide and the head 25, the rod is surrounded by a coil spring 30 which holds the head 25 against the diaphragm under a pressure determined by the adjustment of the member 29.

The body 3 is further cored to permit accommodation and swinging of a lever 31 fulcrumed on a pinion 32. The rear end of the rod 24 is hardened and engages one end of the lever. The other end of the lever engages a pin 33 slidably mounted in the body and adapted to pass loosely through the valve seat 9 whereby to throw the valve off its seat under conditions presently to be described. The mechanical advantage of the lever with respect to the points thereof engaging the rod 24 and pin 33 is preferably in the ratio of 1:3 respectively. The chamber 15 is closed to the atmosphere at the pressure face of the diaphragm by means of a plug 34 screwed therein.

In the use of the device, the spring 30 is adjusted by means of the nut 29, after allowance for the intake pressure on the valve 11, to the maximum desired pressure in the receiver 1 or the pressure at which the system is to be opened to the atmosphere. The valve 11 normally rests in the bottom of the cage 10 wherein it leaves the passage 6 unobstructed and the intake 4 open to the atmosphere relief 7. Thus, on the initial operation of the pump 2, the fluid delivered thereby is discharged to the atmosphere, and the valve closes on the seat 9 only when the pressure developed by the pump is sufficient to lift and move the valve to closed position. On the continued operation of the pump the pressure generated thereby is sufficient to raise the valve 18 and thus charge the tube 14 or tank 1. The tank pressure is at all times communicated to the chamber 15 at the forward side of the diaphragm 20 through the port 16. So long as this pressure is less than that of the spring 30 plus the pressure on the valve 11, the diaphragm is not flexed, but when the tank pressure is sufficient to overcome the resistance of the spring and valve 11, the rod 24 is displaced against the spring within the limits permitted by the recess 26.

This movement of the rod 24 swings the lever 31 so that the pin 33 is moved towards the intake 4 through a displacement substantially three times as great as that of the rod. In the closed position of the valve 11, the pin is in close proximity to the valve, so that in the initial displacement the pin moves the valve off its seat 9. The initial uncovering of the seat 9 is followed by a more rapid movement of the pin 33 which obviously causes the pump to discharge to the atmosphere.

When the fluid pressure in the chamber 15 drops to about 10% below that of the spring 30, the latter moves the rod 24 to the limit permitted by the recess 26. The pin 33 is then free to be repelled when the valve 11 is carried to its seat by the intake pressure.

It will now be seen that, since the regulator is open to the atmosphere when the system is idle, a positive pressure is required to close it, and defects or leaks in the system will prevent charging of the receiver rather than permit overcharging. Inasmuch as all fluid reaching the receiver must pass through the regulator, the control of pressure is exercised before charging rather than after charging. If the valve 11 should become frozen in open position in water or lubricant while standing idle, the compressor will discharge into the atmosphere until sufficient heat is developed to release the valve.

A check valve 35 is provided at the inlet of the receiver 1 and seals the receiver from the line 14 except during charging into the receiver. Because of this valve, a leak in the line 14 does not necessarily exhaust the receiver but rather lowers the pressure in the chamber 15 and causes the atmosphere relief 7 to close. Despite the check valve 35, the equivalent of the pressure in the receiver 1 is built up in the chamber 15 because of the pump pressure required to open the valve.

Although a specific embodiment of the invention has been illustrated and described, it will be apparent that various alterations in the details of construction may be made without departing from the spirit of the invention as indicated by the appended claims.

What I claim is:—

1. In combination with a fluid pump and a receiver, a pressure regulator having a relief opening, said regulator having an intake connected to said pump and an outlet connected to said receiver, a normally open valve adapted to govern communication between said intake and relief opening, said valve being positioned to be moved from open to closed position by pressure in said intake, means exposed to said outlet adapted to open said valve at a given pressure in the outlet, the connections from said regulator to said pump and receiver constituting the sole means of communication between the pump and the receiver.

2. A pressure regulator comprising a body having an intake, an outlet and a relief opening, a normally open valve controlling communication between said intake and relief opening and adapted to be moved from open to closed position by pressure in said intake, and means exposed to said outlet adapted to open said valve at a given pressure in said outlet.

3. A pressure regulator comprising a body having an intake, an outlet, a relief opening and a passage connecting said intake to said opening, a normally open valve in said passage and adapted to close by pressure in said intake, and a pressure actuated linkage having one end exposed to the outlet and the other end adapted to move said valve from closed to open position.

4. A pressure regulator comprising a body having an intake, an outlet, a relief opening and a passage connecting said intake to said opening, a normally open valve in said passage and adapted to be moved from open to closed position by pressure in said intake, a pressure actuated linkage having one end exposed to the outlet and the other end adapted to move said valve from closed to open position, a spring applied to said linkage and adapted to oppose pressure in said outlet, and means for adjusting the tension of said spring.

5. A pressure regulator comprising a body having an intake, an outlet, a relief opening and a passage connecting said intake to said opening, a normally open valve in said passage and adapted to be moved from open to closed position by pressure in said intake, a diaphragm having one side exposed to said outlet, and a linkage having one end engaging the other side of said diaphragm and its other end adapted to move said valve from closed to open position.

6. A pressure regulator comprising a body having an intake, an outlet, a relief opening and a passage connecting said intake to said opening, a normally open valve in said passage and adapted to be moved from open to closed position by pressure in said intake, a diaphragm having one side exposed to said outlet, a linkage having one end engaging the other side of said diaphragm and its other end adapted to move said valve from closed to open position, a spring applied to said linkage and adapted to oppose pressure in said outlet, and means for adjusting the tension of said spring.

7. A pressure regulator comprising a body having an intake, an outlet, a relief opening and a passage connecting said intake to said opening, a normally open valve in said passage and adapted to be moved from open to closed position by pressure in said intake, a lever pivoted to said body, a rod having one end adapted for movement by pressure in said outlet and the other end engaging one end of said lever, the other end of said lever being adapted to move said valve from closed to open position on actuation of said rod by a given pressure in said outlet.

8. A pressure regulator comprising a body having an intake, an outlet, a relief opening and a passage connecting said intake to said opening, a normally open valve in said passage and adapted to be moved from open to closed position by pressure in said intake, a lever pivoted to said body, a rod having one end adapted for movement by pressure in said outlet and the other end engaging one end of said lever, the other end of said lever being adapted to move said valve from closed to open position on actuation of said rod by a given pressure in said outlet, a spring on said rod adapted to oppose movement of the rod under pressure in said outlet, and means for adjusting the tension of said spring.

9. A pressure regulator comprising a body having an intake, an outlet, a relief opening and a passage connecting said intake to said opening, a normally open valve in said passage and adapted to be moved from open to closed position by pressure in said intake, a diaphragm having one side exposed to said outlet, a lever pivoted to said body, a rod having one end engaging the other side of said diaphragm and its other end engaging an end of said lever, the other end of said lever being adapted to move said valve from closed to open position on actuation of said diaphragm by a given pressure in said outlet.

10. A pressure regulator comprising a body having an intake, an outlet, a relief opening and a passage connecting said intake to said opening, a normally open valve in said passage and adapted to be moved from open to closed position by pressure in said intake, a diaphragm having one side exposed to said outlet, a lever pivoted to said body, a rod having one end engaging the other side of said diaphragm and its other end engaging an end of said lever, the other end of said lever being adapted to move said valve from closed to open position on actuation of said diaphragm by a given pressure in said outlet, a spring on said rod adapted to oppose movement of the rod under pressure in said outlet, and means for adjusting the tension of said spring.

In testimony whereof I affix my signature.

FRANK B. STOVER.